(12) United States Patent
Konchitsky (10) Patent No.: US 7,514,993 B2
(45) Date of Patent: Apr. 7, 2009

(54) IQ DEMODULATOR

(76) Inventor: Alon Konchitsky, 100 Larkspur Landing Cir., Suite 212, Larkspur, CA (US) 94939

( * ) Notice: Subject to any disclaimer, the term of this patent is extended or adjusted under 35 U.S.C. 154(b) by 162 days.

(21) Appl. No.: 11/675,354

(22) Filed: Feb. 15, 2007

(65) Prior Publication Data

US 2007/0200618 A1    Aug. 30, 2007

Related U.S. Application Data

(60) Provisional application No. 60/766,860, filed on Feb. 15, 2006.

(51) Int. Cl.
*H04L 27/22* (2006.01)

(52) U.S. Cl. ............... 329/304; 329/310; 375/316; 375/328

(58) Field of Classification Search ............... 329/304, 329/305, 306, 307, 310; 375/316, 328
See application file for complete search history.

(56) References Cited

U.S. PATENT DOCUMENTS 6,624,691 B1 *   9/2003   Sasaki ............... 329/304
7,302,013 B2 *  11/2007   Samueli et al. ............. 375/316

* cited by examiner

*Primary Examiner*—Daniel D Chang
(74) *Attorney, Agent, or Firm*—Steven A. Nielsen; Allman & Nielsen, P.C.

(57) ABSTRACT

A method and apparatus for the demodulation, filtering, decimation and optional voltage multiplication of modulated signals to produce in-phase and quadrature outputs using a discrete time architecture.

15 Claims, 9 Drawing Sheets

Discrete Time I/Q Demodulator

Figure 1a - Prior Art - Analog Demodulator

Figure 1b - Prior Art - Analog I/Q Demodulator

Figure 2 - Discrete Time I/Q Demodulator

Figure 3a - Top Level Drawing of the I/Q Demodulator Demodulator

FIG. 3b

Figure 3c - Top Level Drawing of Filter Block

Figure 3d - Detailed Drawing of Signal Processing Stage

Figure 3e - Detailed Drawing of Singler Stage

Figure 3f - Detailed Drawing of Voltage Multiplication Stage

Figure 4 - Example of Discrete I/Q Demodulator Filter Response

Figure 5 - Example of Clock Timing of
I/Q Demodulator

US 7,514,993 B2

IQ DEMODULATOR

CROSS-REFERENCE TO RELATED APPLICATIONS

This application claims the benefit of U.S. provisional patent application No. 60/766,860 filed on Feb. 15, 2006, which is incorporated herein by reference.

STATEMENT REGARDING FEDERALLY SPONSORED RESEARCH OR DEVELOPMENT

Not Applicable

REFERENCE TO A SEQUENCE LISTING

Not Applicable

FIELD OF THE INVENTION

The invention relates to means and methods of creating and using communication receivers, and particularly demodulation.

BACKGROUND OF THE INVENTION

Figure 1A:
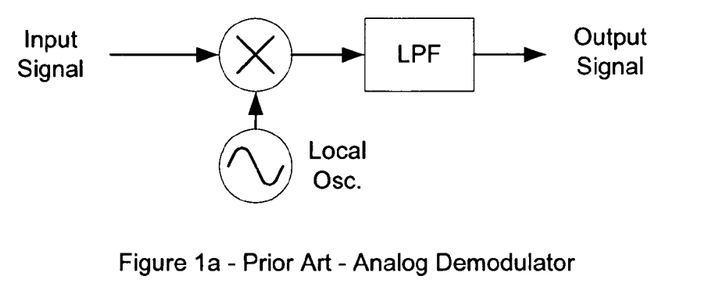
Figure 1B:
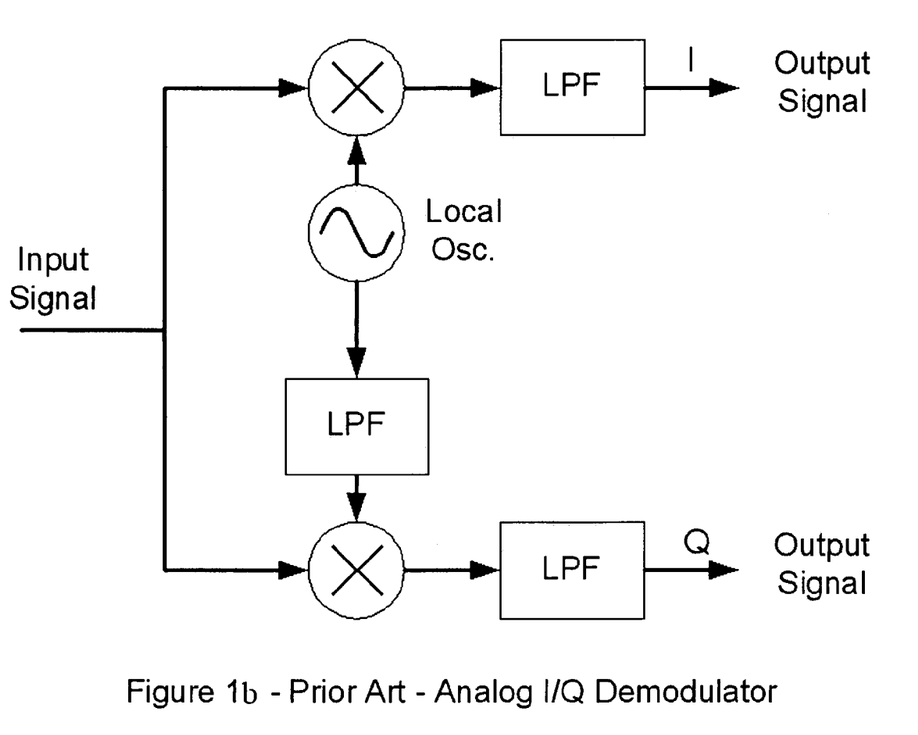
Figure 2:
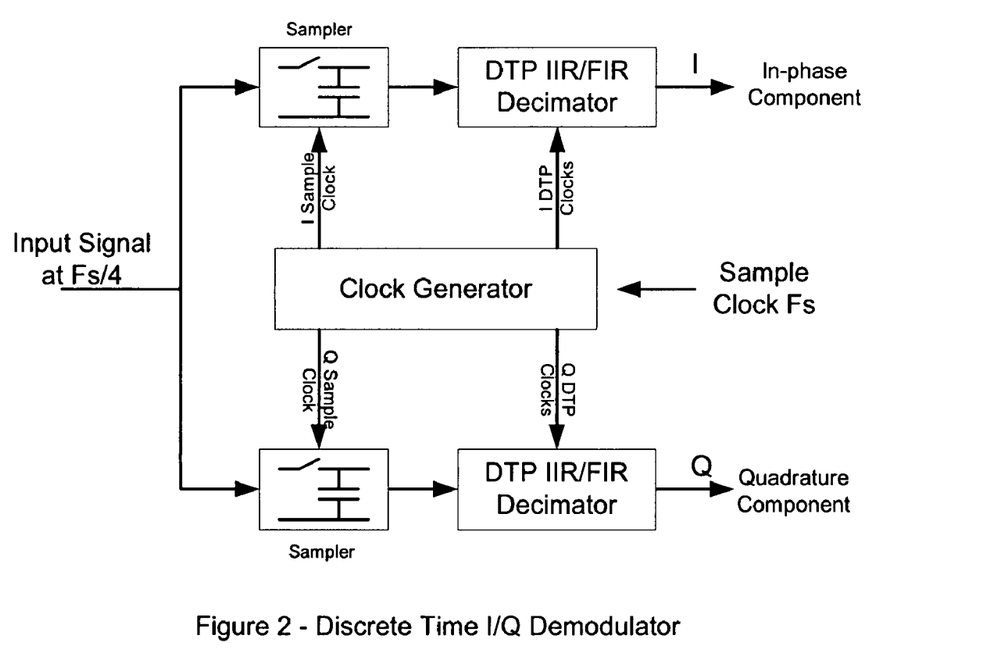

An important aspect of any radio receiver is demodulation. The desired signal is generally translated, or modulated, to a higher frequency, the carrier frequency, for efficient transmission between the transmitter and the receiver. The process of translating the desired signal back down from the carrier frequency to lower frequencies is known as demodulation. Conventional circuits use a continuous time mixer, a highly non-linear analog component, to translate the signals down in frequency in a receiver. A block diagram of a conventional mixer-based demodulator is shown in FIG. 1a. The value of the output frequencies is determined by the frequency of the local oscillator input to the mixer, and generally results in the production of the sum and difference frequencies of the input carrier and the local oscillator. A conventional I/Q demodulator is constructed using 2 mixers with the same local oscillator frequency, with a phase difference of 90 degrees. This produces 2 outputs labeled In-Phase (I) and Quadrature (Q) as shown in FIG. 1b

BRIEF SUMMARY OF THE INVENTION

This demodulator performs the functions of I and Q demodulation using discrete time circuit techniques. The input is sampled at a rate of 4 times the frequency which is to be demodulated to d.c. by the clock applied to the sample and share input stage. The signal is demodulated by manipulating the charge in the circuit by means of clock signals, switches and capacitors. The invention effectively combines demodulation, sine and cosine multiplication, optional voltage amplification filtering and decimation in a single circuit.

BRIEF DESCRIPTION OF THE DRAWINGS

FIG. 1a Prior art—Analog demodulator
FIG. 1b Prior art—Analog I/Q demodulator
FIG. 2 Discrete time I/Q demodulator
FIG. 3a Top Level Drawing of the Preferred Embodiment of the Invention
FIG. 3b Detailed Drawing of the Sample and Hold Block
FIG. 3c Top Level Drawing of Filter Block
FIG. 3d Detailed Drawing of a Signal Processing Stage
FIG. 3e Detailed drawing of voltage multiplication stage
FIG. 3f Detailed Drawing of Voltage Multiplication Stage
FIG. 4 Example of clock timing I/Q Demodulator
FIG. 5 Example of filter response

DETAILED DESCRIPTION OF THE PREFERRED EMBODIMENT OF THE INVENTION

Figure 3A:
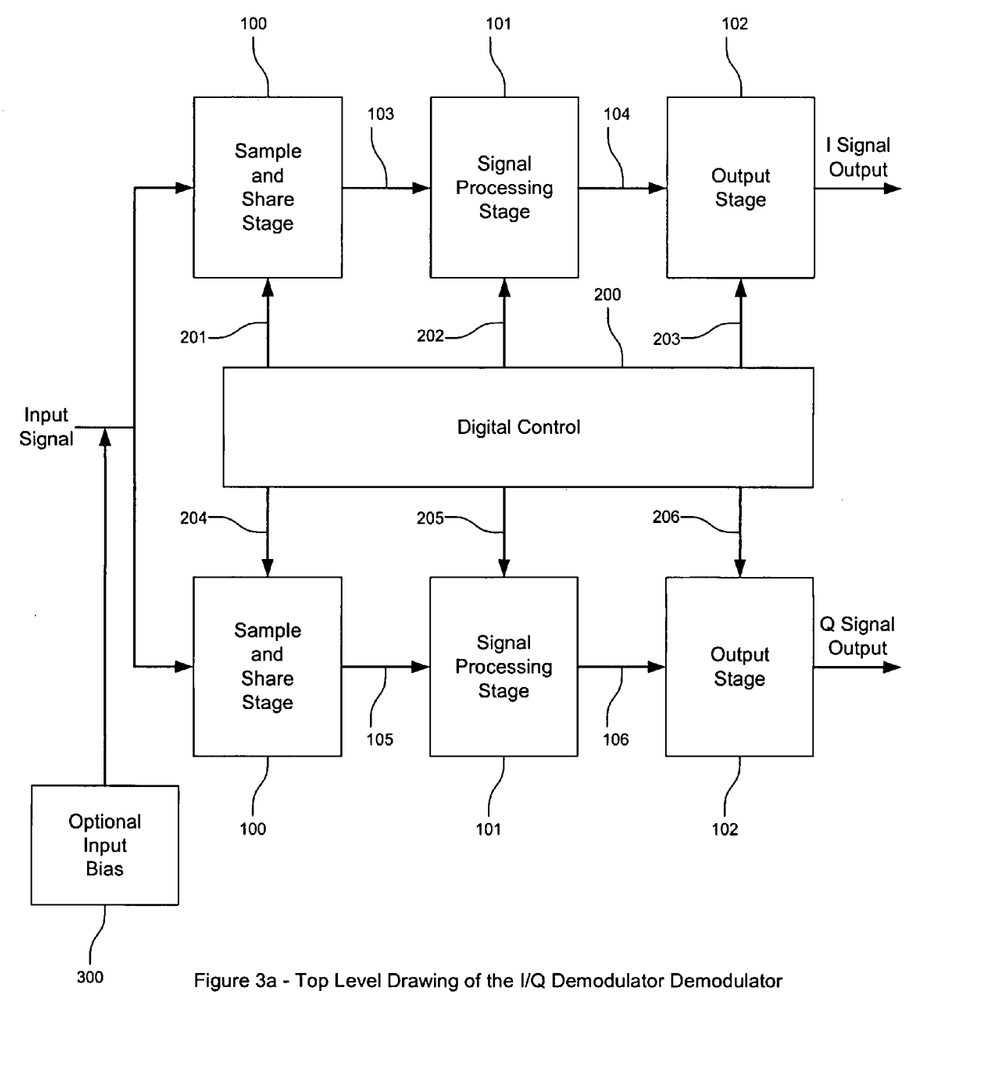

FIG. 3a shows the top level drawing of the I/Q demodulator. The main components are the sample and share stages, the signal processing stages, the output stages and the optional biasing block. The figure shows that the input signal is split into two separate paths to process the I and Q components of the demodulator. Each of the stages in the circuit are identical for both paths. The implementation of the I and Q paths differs only in the clock phasing applied to each half circuit by the clock generator. In this example, a separate sample and hold block is used for both I and Q paths. However, the invention can also be implemented with a single sample and hold stage depending on the coupling to the previous stage and on the settling time available from the technology. The signal processing stage is implemented as a decimating, N-stage FIR filter and generally requires separate control signals for each tap. In FIG. 3a, the control signals 201 to 206 represent buses with numerous control lines for each stage of the demodulator and each section (tap) of the filter. Also, the filter can have more than a single path depending on the number of taps and the decimation ratio, which means that there are also separate control signals for each path.

Figure 3B:
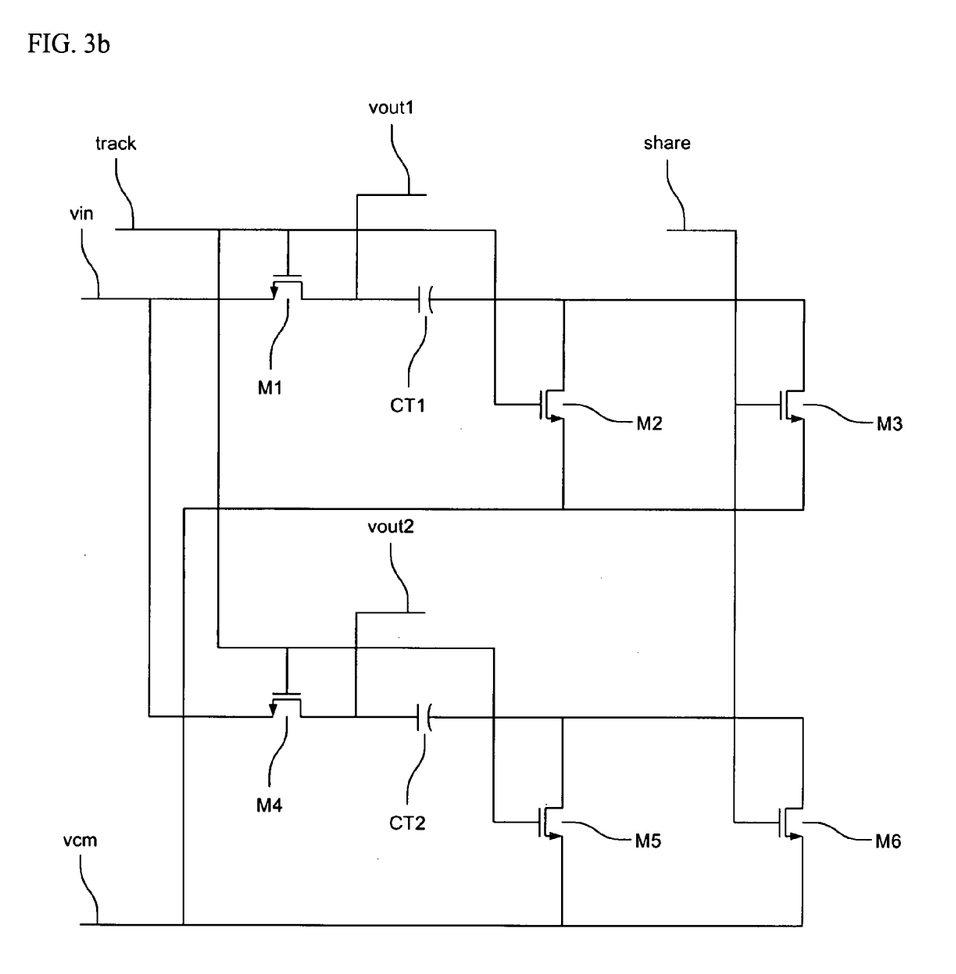

The details of the sample and share block are shown in FIG. 3b. This figure shows a single ended configuration to simplify the description of the operation of the circuitry. The single ended configuration will be used in drawings and explanations wherever possible. However, the preferred embodiment uses a differential topology throughout to implement the same function, with better rejection of common mode noise and interference. The invention is equally applicable to differential or single ended topology except where noted. The sample and share stage is shown here with two outputs as used with the example of a two path signal processing stage, but can in fact provide any number of outputs. Charge is sampled onto the capacitors CP1 and CP2, using the control signal "track. After the signal has been sampled, it is shared with capacitors in the filter sections using the control signal "share". For ease of explanation, when more than one device switch is closed in a series circuit, only one phase will be shown. For example, in FIG. 3b, the signal "track" is shown connected to M1 and M2 devices in series with capacitor CT1. In the preferred embodiment, a delayed version of "track", "dtrack" is used on M1 to minimize charge injection onto capacitor CT1 and on M4 to minimize charge injection onto capacitor CT2. This technique is well known to those skilled in the art of "switched capacitor" techniques. It does not change the basic signal processing functionality of the circuit and will not be shown explicitly in the circuit diagrams and descriptions.

Figure 3C:
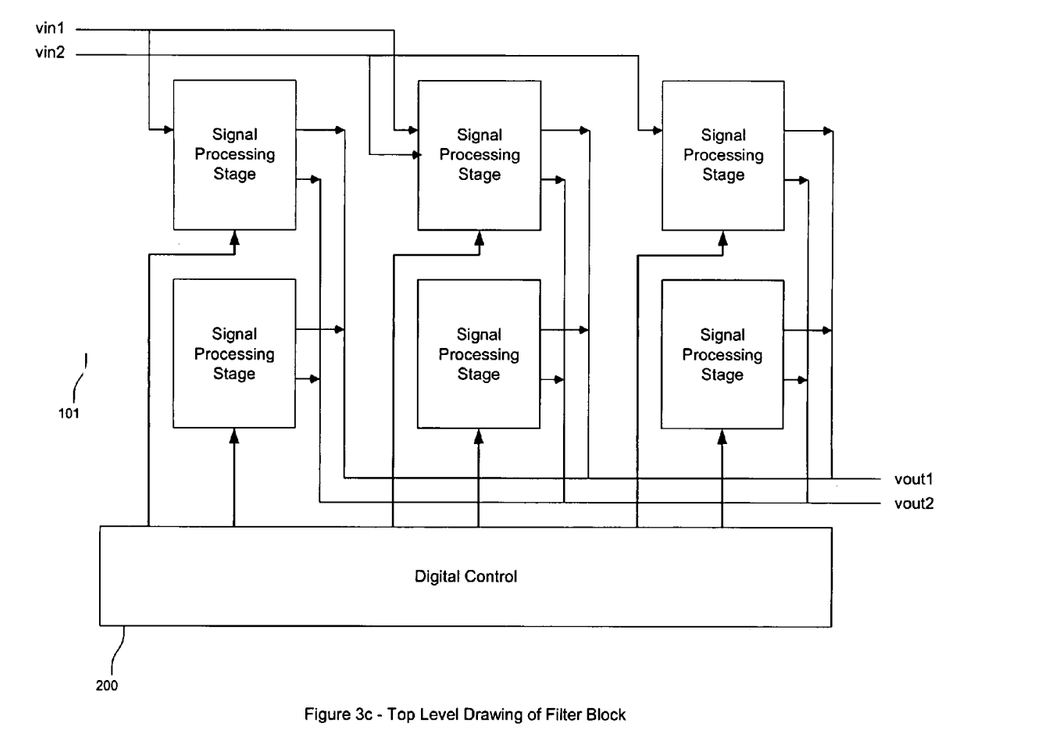

The filter block consists of a number of stages, sized to achieve the desired transfer function. Each stage has separate clock inputs (fshare<n1,n2> to control the operation of filter tap n1 in path n2. In the signal processing block, shown in FIG. 3c, there are 2 separate paths to allow processing one set of samples while the other set is being acquired. In this way, the signal processing stage can process a sequence of data from 6 consecutive sample periods without losing any data. Both positive and negative coefficients are needed in general. In the single ended case, an inverter is required to change signs, while in a differential topology, the positive and negative coefficients are implemented by appropriate connections to the inverted and non-inverted outputs from the sample and share section.

Figure 3D:
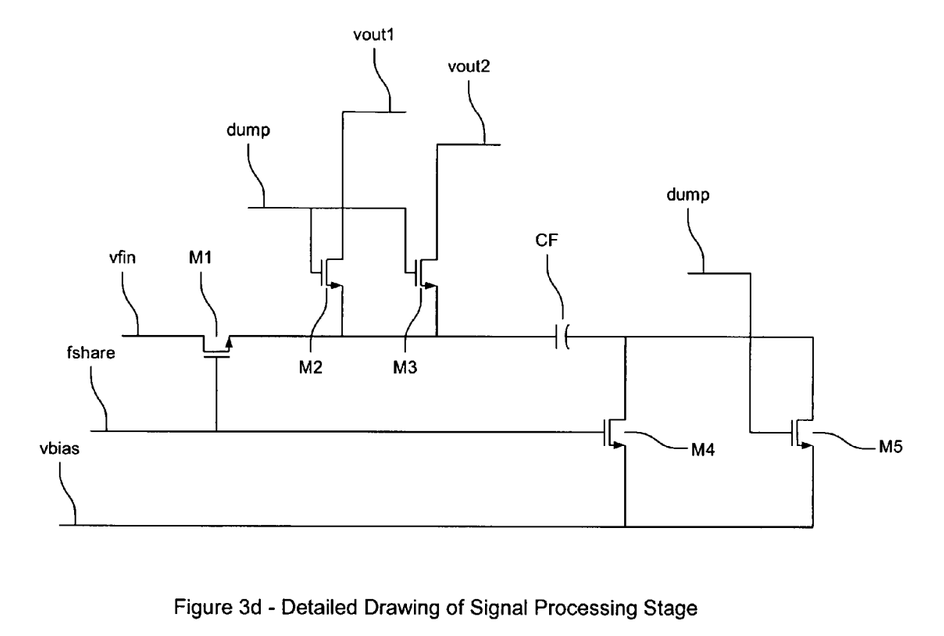

FIG. 3d shows a detailed drawing of a single signal processing stage. It consists of storage capacitor CF and switch devices M1 to M5. The control signals are fshare and dump. The fshare controls connect the signal processing stage to the sample and share stage described above and the dump control signals connect the filter to the output stage. Filtering is accomplished by summing samples from several signal processing stages together during the dump phase. Signals are acquired sequentially from the input vfin, and several stages are simultaneously connected to the next stage using the dump signals.

Figure 3E:
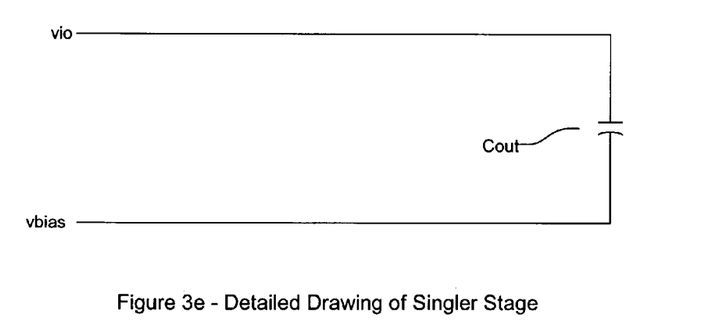

FIG. 3e shows the final stage for the case of no voltage multiplication. This stage consists of a single storage capacitor Cout. The control signals and switches for transferring charge from the signal processing stage (dump signals) are located in the signal processing stage described above.

Figure 3F:
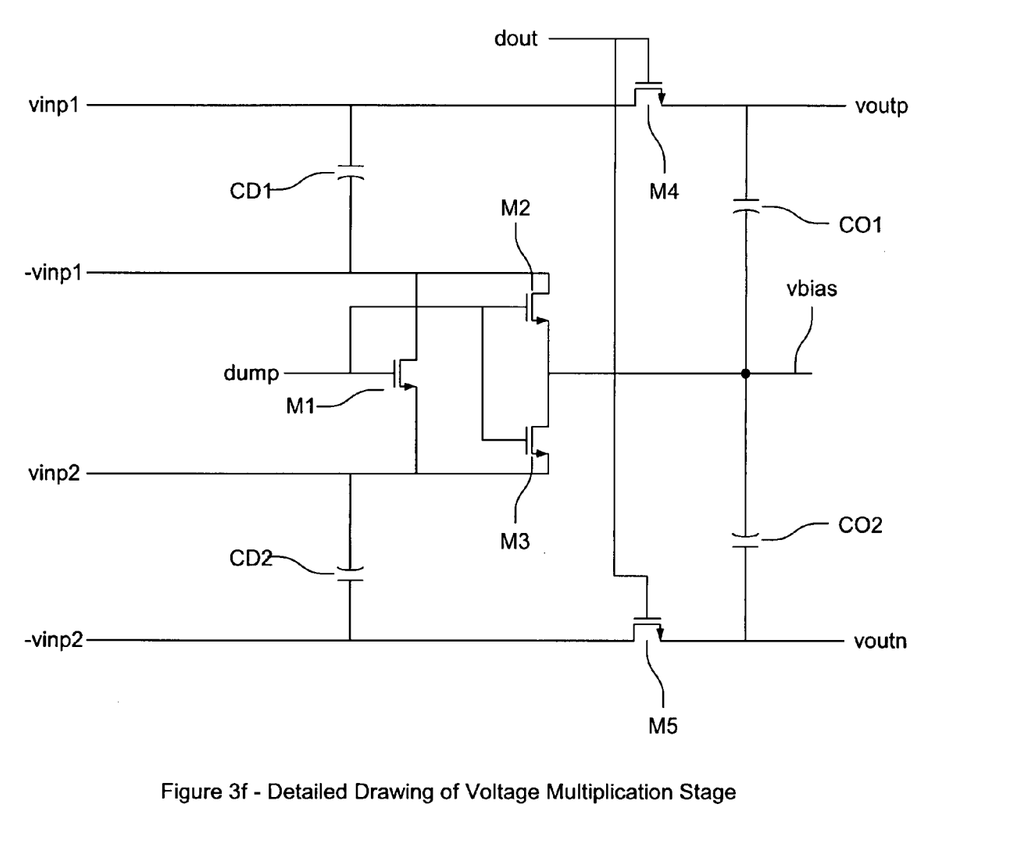

FIG. 3f shows the final stage for the case of voltage multiplication by 2. This stage requires 2 outputs from each signal processing stage as well as both positive and negative input signals. The operation of this stage is best illustrated and explained for the differential case. This stage consists of 2 doubling capacitors CD1 and CD2, 2 output capacitors CO1 and CO2, and switching devices M1 to M5. The control signal dout transfers charge from the doubling capacitors CD1 and CD2 to the output capacitors CO1 and CO2. The voltage multiplication is realized by charging the doubling capacitors while they are connected in parallel from the dump signals in the previous signal processing stages, and discharging the doubling capacitors while they are connected in series, using the dout control signal.

Figure 5:
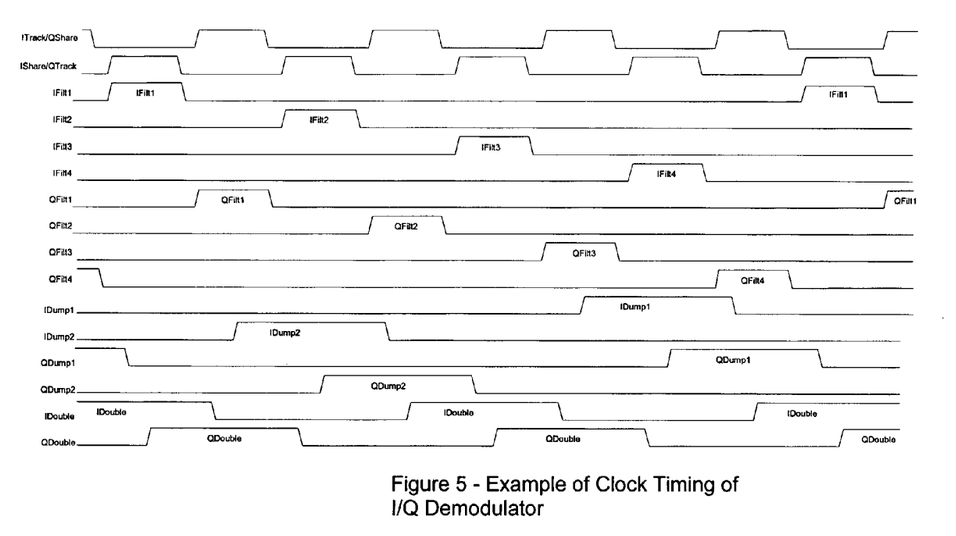

An example magnitude response of the transfer function of the I/Q demodulator relative to the input frequency is shown in FIG. 5. The peak of the transfer function is located at one-quarter of the sample rate which represents the center frequency to be demodulated. Note that this is the transfer function relative to the input. Relative to the output, the transfer function peaks around d.c. reflecting the fact that the input signal at one-quarter of the sample rate is translated to d.c. The coefficients used in the illustrated filter are 10-2010.

Figure 4:
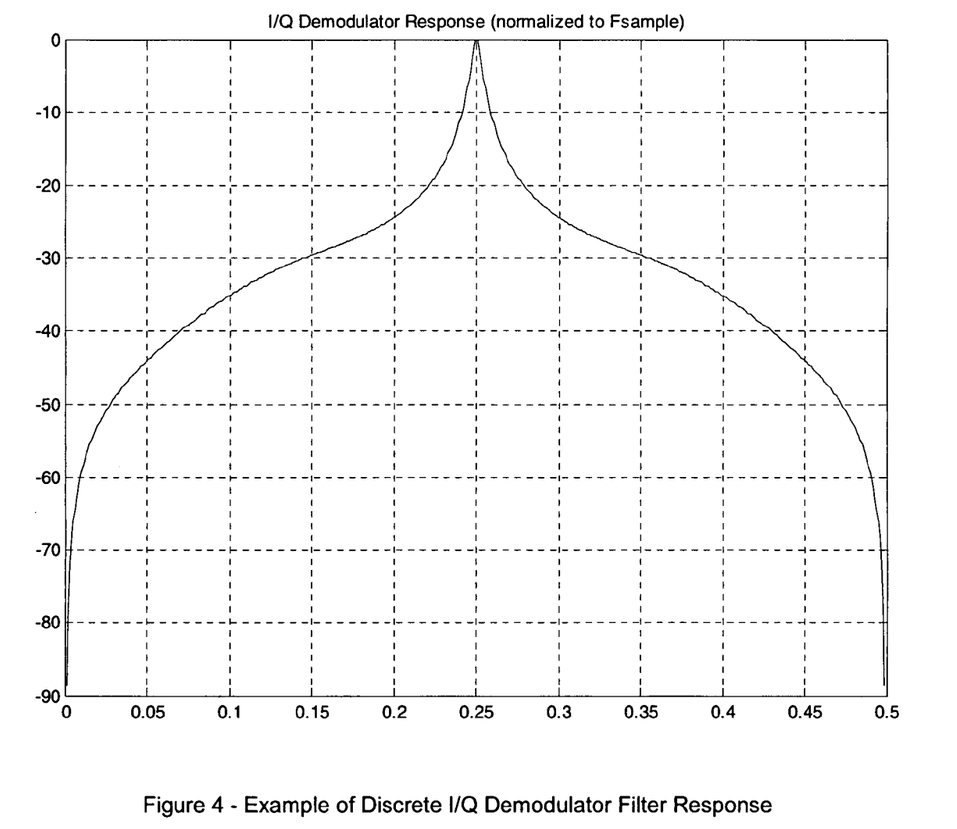

FIG. 5 shows the timing diagram for the filter illustrated in FIG. 4. For the case of the I path, the signals used are sampled in the sample and share stage using Itrack. The 4 share signals which go to the signal processing stages are labeled IFilt1 to IFilt4. IFilt1 to IFilt3 are used to transfer the input signal sequentially to the signal processing capacitors to represent the coefficients 1, −2, and 1. During IFilt4, the 3 coefficient values are dumped simultaneously to the output stage. In order not to miss the next input sample, a second path of signal processing stages is required. This second path samples data during IFilt3, IFilt4 and IFilt1 and outputs the result during IFilt2. The signals IDump1 and IDump2 are used to connect the signal processing stages to the output stage. In addition, if a voltage doubler is used, the control signal IDouble is used to connect the voltage doubler to the final output. A similar set of control signals prefaced by Q, is used to control the Q path of the IQ demodulator.

While the foregoing is a detailed description of the preferred embodiment of the invention, there are many alternative embodiments of the invention that would occur to those skilled in the art and which are within the scope of the present invention. Accordingly, the present invention is to be determined by the following claims.

What is claimed is:

1. An apparatus for simultaneously demodulating an input signal frequency into in-phase (I) components and quadrature-phase (Q) components, the apparatus comprising:
   a) an input signal frequency split into an in-phase (I) component path and a quadrature (Q) component path;
   b) wherein the in-phase component path comprises an I sampler receiving input from the input signal frequency and an I sample clock, and wherein the I sampler sends a resulting signal to a discrete time processing infinite impulse response/finite impulse response (DTP IIR/FIR) decimator and the DTP IIR/FIR decimator receives further input from an I DTP clock and wherein the resulting output of the DTP IIR/FIR decimator comprises an in-phase component of a resulting signal;
   c) wherein the quadrature component path comprises a Q sampler receiving input from the input signal frequency and a Q sample clock, and wherein the Q sampler sends a resulting signal to a DTP IIR/FIR decimator and the DTP IIR/FIR decimator receives further input from a Q DTP clock and wherein the resulting output of the DTP IIR/FIR decimator comprises a quadrature component of a resulting signal; and
   d) wherein a clock generator comprises two identical discrete-time networks, with one network providing input to the in-phase component path by controlling the I sample clock and the I DTP clock and wherein the other network provides input to the quadrature component path by controlling the Q sample clock and the Q DTP clock.

2. The apparatus of claim 1, where a phase difference in the in-phase component path is accomplished by choosing a sample rate for the I sample clock and I DTP clock which is four times the input signal frequency.

3. The apparatus of claim 1, wherein FIR coefficients used in either DTP IIR/FIR decimator are chosen such that half are zero, requiring no computation.

4. The apparatus of claim 1, where the input signal frequency is demodulated to DC.

5. An apparatus for simultaneously demodulating a signal into in-phase (I) and quadrature-phase (Q) components, the apparatus comprising:
   a) an input signal frequency split into an in-phase (I) component path and an quadrature component path;
   b) wherein the in-phase component path comprises an I sampler receiving input from the input signal frequency and an I sample clock, and wherein the I sampler sends a resulting signal to a DTP IIR/FIR decimator and the DTP IIR/FIR decimator receives further input from an I DTP clock and wherein the resulting output of the discrete time processing infinite impulse response/finite impulse response (DTP IIR/FIR) decimator comprises an in-phase component of a resulting signal;
   c) wherein the quadrature component path comprises a Q sampler receiving input from the input signal frequency and a Q sample clock, and wherein the Q sampler sends a resulting signal to a DTP IIR/FIR decimator and the DTP IIR/FIR decimator receives further input from a Q DTP clock and wherein the resulting output of the DTP IIR/FIR decimator comprises a quadrature component of a resulting signal;
   d) wherein a clock generator comprises two identical discrete-time networks, with one network providing input to the in-phase component path by controlling the I sample clock and the I DTP clock and wherein the other network provides input to the quadrature component path by controlling the Q sample clock and the Q DTP clock; and e) the components of the in-phase component path and the quadrature component path are constructed from switches and capacitors only.

6. The apparatus of claim 5, wherein a phase difference is accomplished by choosing a sample rate which is four times the signal frequency.

7. The apparatus of claim 5, where anti-alias filtering and decimating is implemented with a multi-path FIR filter used in place of either DTP IIR/FIR decimator.

8. The apparatus of claim 5, where a decimation of four is used in the DTP IIR/FIR decimator of the in-phase component path.

9. The apparatus of claim 5, wherein FIR coefficients used in either DTP IIR/FIR decimator are chosen such that half are zero, requiring no computation.

10. The apparatus of claim 5, where the input signal frequency is demodulated to DC.

11. The apparatus of claim 2, where an optional sampler converts a continuous voltage to a discrete-time digital signal for use in a receiver.

12. The apparatus of claim 2, where an optional voltage doubler provides gain to the signal frequency.

13. The apparatus of claim 1, wherein anti-alias filtering and decimating is implemented within the in-phase component path and quadrature component path with a multi-path FIR filter used to replace either DTP IIR/FIR decimator.

14. The apparatus of claim 1, wherein a decimation rate of four is used to control the clock generator.

15. An apparatus for simultaneously demodulating an input signal frequency into in-phase (I) components and quadrature-phase (Q) components, the apparatus comprising:
   a) an input signal frequency split into an in-phase (I) component path and an quadrature component path;
   b) wherein the in-phase component path comprises an I sampler receiving input from the input signal frequency and an I sample clock, and wherein the I sampler sends a resulting signal to a discrete time processing infinite impulse response/finite impulse response DTP IIR/FIR) decimator and the DTP IIR/FIR decimator receives further input from an I DTP clock and wherein the resulting output of the DTP IIR/FIR decimator comprises an in-phase component of a resulting signal;
   c) wherein the quadrature component path comprises a Q sampler receiving input from the input signal frequency and a Q sample clock, and wherein the Q sampler sends a resulting signal to a DTP IIR/FIR decimator and the DTP IIR/FIR decimator receives further input from a Q DTP clock and wherein the resulting output of the DTP IIR/FIR decimator comprises a quadrature component of a resulting signal;
   d) wherein a clock generator comprises two identical discrete-time networks, with one network providing input to the in-phase component path by controlling the I sample clock and the I DTP clock and wherein the other network provides input to the quadrature component path by controlling the Q sample clock and the Q DTP clock;
   e) wherein a phase difference in the in-phase component path is accomplished by choosing a sample rate for the I sample clock and I DTP clock which is four times the input signal frequency; and
   f) an optional voltage doubler provides gain to the signal frequency.

* * * * *